(12) United States Patent
Muramatsu et al.

(10) Patent No.: US 11,092,178 B2
(45) Date of Patent: Aug. 17, 2021

(54) VEHICLE COMPONENT FASTENING STRUCTURE

(71) Applicant: SHIROKI CORPORATION, Fujisawa (JP)

(72) Inventors: Atsushi Muramatsu, Fujisawa (JP); Kenji Yamamoto, Fujisawa (JP); Kenichi Suzuki, Fujisawa (JP)

(73) Assignee: SHIROKI CORPORATION, Fujisawa (JP)

( * ) Notice: Subject to any disclaimer, the term of this patent is extended or adjusted under 35 U.S.C. 154(b) by 292 days.

(21) Appl. No.: 16/406,459

(22) Filed: May 8, 2019

(65) Prior Publication Data

US 2019/0345962 A1 Nov. 14, 2019

(30) Foreign Application Priority Data

May 11, 2018 (JP) .............................. JP2018-092569

(51) Int. Cl.
*F16B 5/06* (2006.01)
*F16B 43/02* (2006.01)

(52) U.S. Cl.
CPC ............ *F16B 5/0642* (2013.01); *F16B 43/02* (2013.01); *F16B 5/06* (2013.01)

(58) Field of Classification Search
CPC ........ F16B 5/06; F16B 5/0642; F16B 41/002; F16B 43/02; E05F 11/483; E05F 15/00
USPC ......................................... 411/103, 107, 108
See application file for complete search history.

(56) References Cited

U.S. PATENT DOCUMENTS

| 2,177,452 | A | * | 10/1939 | Dempsey | ................ F16B 39/24 |
| | | | | | 411/107 |
| 3,401,733 | A | * | 9/1968 | Circle | ................... B28B 23/005 |
| | | | | | 411/107 |
| 3,765,465 | A | * | 10/1973 | Gulistan | ............... F16B 5/0208 |
| | | | | | 411/353 |
| 4,432,680 | A | * | 2/1984 | Molina | ................. F16B 5/0208 |
| | | | | | 411/103 |
| 5,073,070 | A | * | 12/1991 | Chang | ................... F16B 5/0208 |
| | | | | | 411/353 |
| 10,626,962 | B2 | * | 4/2020 | Muramatsu | ......... F16H 19/0645 |

FOREIGN PATENT DOCUMENTS

JP 2015121059 A 7/2015

\* cited by examiner

*Primary Examiner* — Roberta S Delisle
(74) *Attorney, Agent, or Firm* — Buchanan Ingersoll & Rooney PC

(57) ABSTRACT

The vehicle component fastening structure includes: a boss receptacle and a boss provided in a pair of the vehicle components, and a fastening member for fastening the boss and the boss receptacle. The boss receptacle has a through-hole penetrating in a fastening axis direction and a nipped portion provided inside the through-hole. The boss has a fastener hole, and a leading end of the boss oriented to a first direction abuts on the nipped portion. The fastening member has a shank inserted into the through-hole and the fastener hole in a second direction and a head abutting on the nipped portion. In the fastened state, a bottom face of the head abuts on the nipped portion, and the entire bottom face and a portion of the nipped portion where the leading end of the boss abuts are placed within a range of the through-hole in the fastening axis direction.

4 Claims, 12 Drawing Sheets

VEHICLE COMPONENT FASTENING STRUCTURE

BACKGROUND OF THE INVENTION

1. Field of the Invention

The present invention relates to a fastening structure for fastening vehicle components.

2. Description of the Related Art

Bolting or riveting is used in many cases as means for securing vehicle components to each other. For example, Patent Document 1 (Japanese Unexamined Patent Application Publication No. 2015-121059) discloses a window regulator for vertically driving a window glass, in which a drum housing that houses a drum by winding a wire and a motor unit that rotationally drives the drum are fastened using bolts.

An example of such a type of fastening structure is illustrated in FIG. 17. A motor unit 100 is provided with a boss 101. The boss 101 has a cylindrical shape having an internal insertion hole 101a, and a column 102 formed of metal such as aluminum is held (inserted) inside the boss 101. The column 102 is a tubular body internally having a fastening hole 102a having a diameter smaller than that of the insertion hole 101a. A leading end of the column 102 has an abutting portion 103 protruding from the insertion hole 101a. A drum housing 104 is provided with a boss receptacle 105 facing the boss 101. The boss receptacle 105 internally has a through-hole 106, and a tubular collar 107 is fitted to the inside of the through-hole 106. The collar 107 is formed of metal.

A shank 109 of the fastening bolt 108 is inserted into the boss receptacle 105. A male thread is formed on an outer surface of the shank 109, and the shank 109 is fastened to the fastening hole 102a of the column 102 through the collar 107 by tapping or screwing. The fastening bolt 108 has a head 110 having a diameter larger than that of the shank 109 at one end of the shank 109, and the fastening bolt 108 is fastened until the head 110 abuts on an end face of the collar 107 with a predetermined pressure. As a result, the collar 107 is nipped between the head 110 of the fastening bolt 108 and the abutting portion 103 of the boss 101, and the motor unit 100 and the drum housing 104 are fixed to each other. Note that the end face of the collar 107 slightly protrudes from the end face of the boss receptacle 105, and the head 110 of the fastening bolt 108 abuts only on the end face of the collar 107 without interfering with the boss receptacle 105.

In the fastening structure illustrated in FIG. 17, the collar 107 has a length such that one end thereof slightly protrudes from the through-hole 106. Accordingly, the shank 109 of the fastening bolt 108 necessarily has a length that penetrates the color 107. For this reason, the collar 107 and the fastening bolt 108 extend long in the axial direction, so that an increase in cost or weight of parts caused by a large amount of materials used has been a problem.

In a case where rotation of the collar 107 inside the through-hole 106 is restricted, it is necessary to form a knurl or the like on the outer surface of the collar 107 by additional processing, which demands labor and cost in manufacturing.

Since the head 110 of the fastening bolt 108 protrudes from the boss receptacle 105 (through-hole 106), a problem occurs, in which another member comes into contact with the exposed head 110. In order to limit the exposure of the head 110 as a countermeasure, a padding portion surrounding the periphery of the head 110 may be provided in the boss receptacle 105, but this increases the thickness of the entire fastening portion or the labor or cost in manufacturing, disadvantageously.

SUMMARY OF THE INVENTION

In view of the aforementioned problems, it is therefore an object of the present invention to provide a small-sized vehicle component fastening structure that can be manufactured at low cost.

According to an aspect of the present invention, there is provided a vehicle component fastening structure for fixing two vehicle components, including: a boss receptacle provided in one of the vehicle components; a boss provided in the other vehicle component; and a fastening member for fastening the boss and the boss receptacle. The boss receptacle has a through-hole penetrating in a fastening axis direction and a nipped portion provided inside the through-hole by insert-molding to be thinner than the through-hole in the fastening axis direction. The boss internally has a fastener hole, and a leading end of the boss oriented to a first direction of the fastening axis direction abuts on the nipped portion. The fastening member has a shank inserted into the through-hole in a second direction opposite to the first direction and inserted into the fastener hole through the nipped portion and a head abutting on the nipped portion. In the fastened state using the fastening member, a bottom face of the head of the fastening member abuts on the nipped portion, and the entire bottom face of the head of the fastening member and a portion of the nipped portion where the leading end of the boss abuts are placed within a range of the through-hole in the fastening axis direction.

In this vehicle component fastening structure, since a portion for nipping the nipped portion between the head of the fastening member and the leading end of the boss is placed with a range of the through-hole in the fastening axis direction, it is possible to implement miniaturization in the fastening axis direction. In addition, since the thickness of the nipped portion of the fastening axis direction or the length of the shaft portion of the fastening member is reduced, it is possible to obtain a light-weighted fastening structure at low cost.

The nipped portion may have a disk shape and may be provided in the boss receptacle by burying a circumferential edge of a radial direction into an inner surface of the through-hole. In this case, it is preferable that the buried amount of the circumference edge of the nipped portion in the radial direction is equal to or larger than the thickness of the nipped portion in the fastening axis direction. As a result, it is possible to improve a load tolerance of the nipped portion in the boss receptacle.

It is preferable that the entire head is placed within a range of the through-hole in the fastening axis direction while the head of the fastening member abuts on the nipped portion. As a result, it is possible to implement space-saving arrangement for a space including the head of the fastening member and simplify or miniaturize the structure around the head of the fastening member.

It is preferable that the through-hole has a tapered surface having an inner diameter increasing toward the first direction in an end of the first direction side. As a result, it is possible improve workability when installing or detaching the fastening member.

As described above, according to the present invention, it is possible to obtain a small-sized vehicle component fastening structure that can be manufactured at low cost.

BRIEF DESCRIPTION OF DRAWINGS

FIGS. 16A and 16B are cross-sectional views illustrating an end structure of the driving wire, in which FIG. 16A illustrates a cross section taken along the line S4-S4 of FIG. 15, and FIG. 16B illustrates a cross section taken along the line S5-S5 of FIG. 15.

DESCRIPTION OF THE EMBODIMENTS

A window regulator for vertically driving a window glass according to an embodiment of the present invention will now be described. Note that this technology may also be applicable to fastening of vehicle components other than the window regulator.

Figure 1:
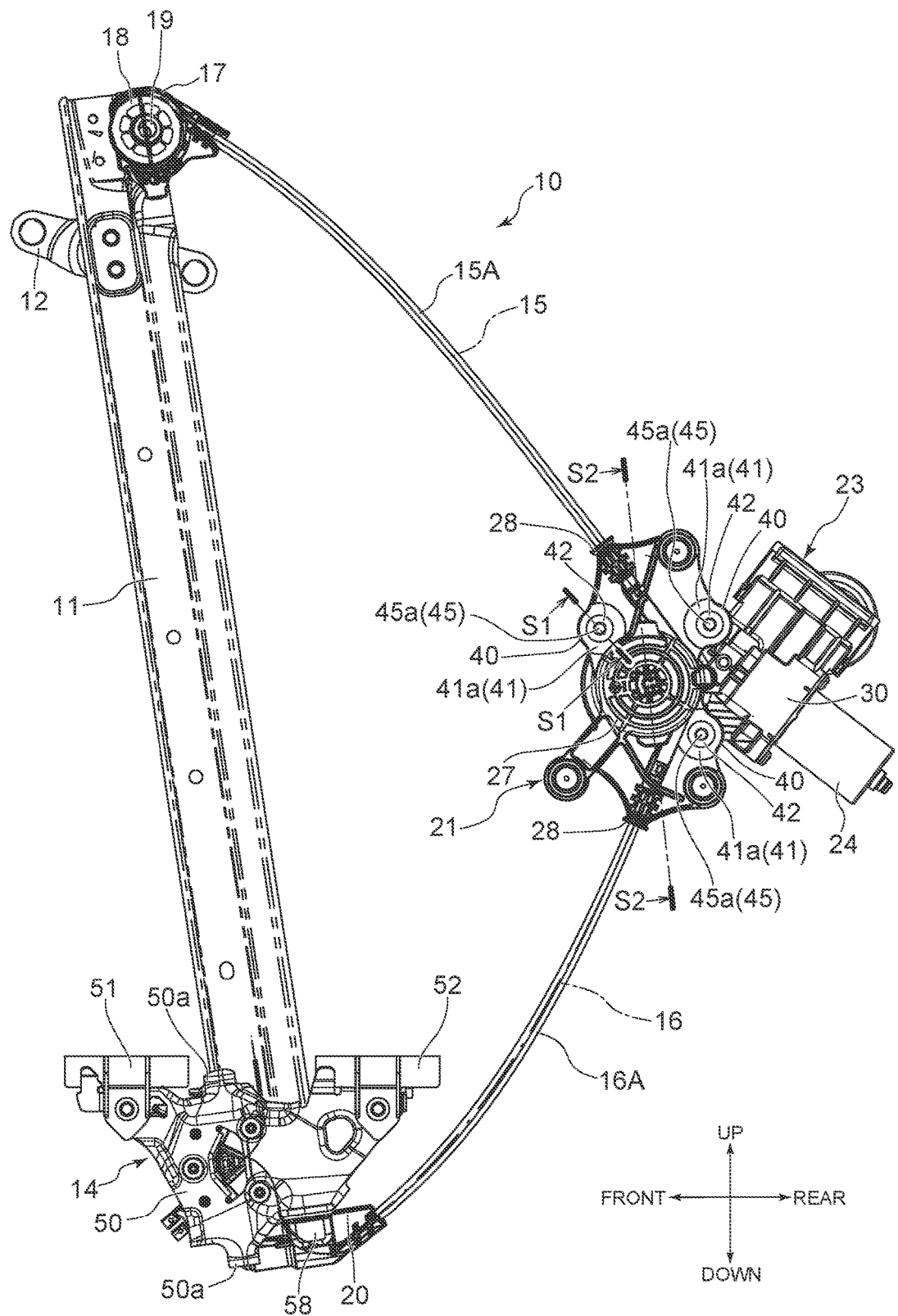
FIG. 1 is a front view illustrating a window regulator according to an embodiment of the present invention.

As illustrated in FIG. 1, the window regulator 10 has a guide rail 11 as a long member. The guide rail 11 is installed in an inner panel 80 (constituting a door panel along with an outer panel (not shown)) of a door of the vehicle as partially illustrated in FIG. 12 using a bracket 12. In addition, a lower end of the guide rail 11 is installed in the inner panel 80 using metal bolts 60 and nuts 61 (FIGS. 11 and 12) described below. The guide rail 11 is arranged such that a longitudinal direction is generally oriented in a height direction of the vehicle (vertical direction of the vehicle) while the inner panel 80 is installed. The window regulator 10 is installed in a side door of the vehicle such that a left/right direction of FIG. 1 becomes a front/rear direction of the vehicle, and a direction orthogonal to a sheet plane of FIG. 1 is placed in the width direction of the vehicle (inward/outward direction of the vehicle).

Figure 9:
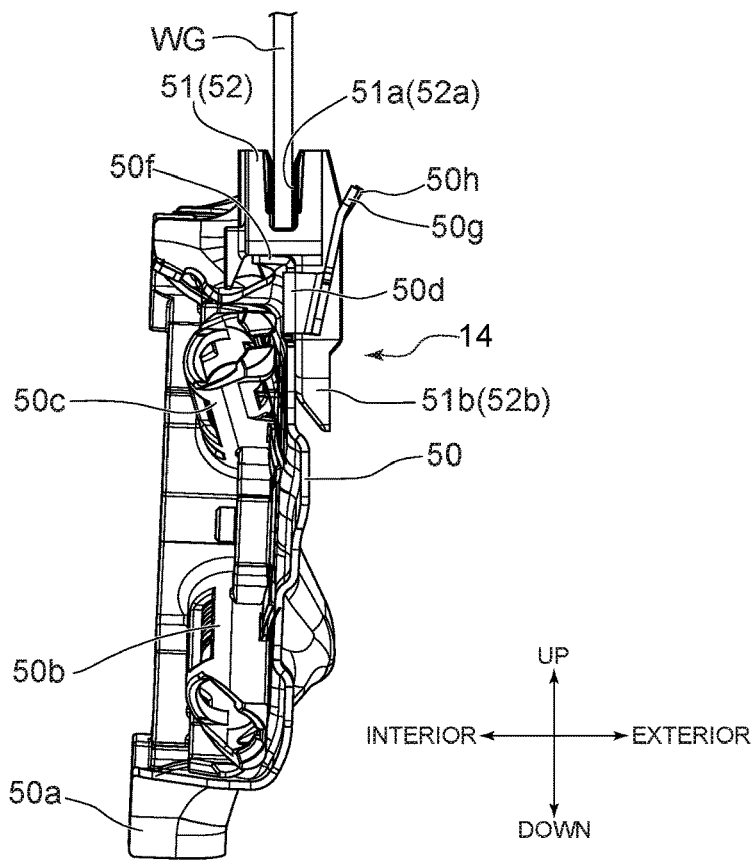
FIG. 9 is a side view illustrating the carrier plate.

The window regulator 10 has a carrier plate 14 which is vertically movably supported by the guide rail 11 and on which a window glass WG (FIGS. 7 and 9) is supported. One end of each of a pair of driving wires 15 and 16 is connected to the carrier plate 14.

As illustrated in FIGS. 7 to 10, the carrier plate 14 has a slider 50 and glass holders 51 and 52. The slider 50 has a guide portion 50a slidably supported by the guide rail 11 and wire connecting portions 50b and 50c to which each end of the driving wires 15 and 16 is connected. Holder installation portions 50d and 50e where the glass holders 51 and 52 are installed are provided in the upper part of the slider 50. A support wall 50f (FIG. 9) directed upward is provided in each of the holder installation portions 50d and 50e.

The glass holders 51 and 52 have glass holding grooves 51a and 52a (FIGS. 8 and 9) where a lower edge of the window glass WG is inserted. The glass holders 51 and 52 are installed in the holder installation portions 50d and 50e from the upper side to the lower side such that the glass holding grooves 51a and 52a are directed upward. Vertical positions of the glass holders 51 and 52 are determined as they abut on the support wall 50f. In addition, contact portions 51b and 52b provided in the glass holders 51 and 52 abut on a side surface of the slider 50 so that positions of the glass holders 51 and 52 are determined in the width direction (inward/outward direction of the vehicle or thickness direction of the carrier plate 14). In addition, in this positioning state, the glass holders 51 and 52 are fixed to the slider 50 using bolts (not shown).

Introducing guide portions 50g and 50h are provided in the holder installation portions 50d and 50e of the slider 50 such that they are inclined to recede from the glass holders 51 and 52 in the width direction toward the upper side. If the glass holders 51 and 52 abut on the introducing guide portions 50g and 50h when the glass holders 51 and 52 are installed in the slider 50, they are guided to suitable positions by the introducing guide portions 50g and 50h. As a result, it is possible to implement installation with high workability without requiring high positioning accuracy for the slider 50 and the glass holders 51 and 52.

Figure 7:
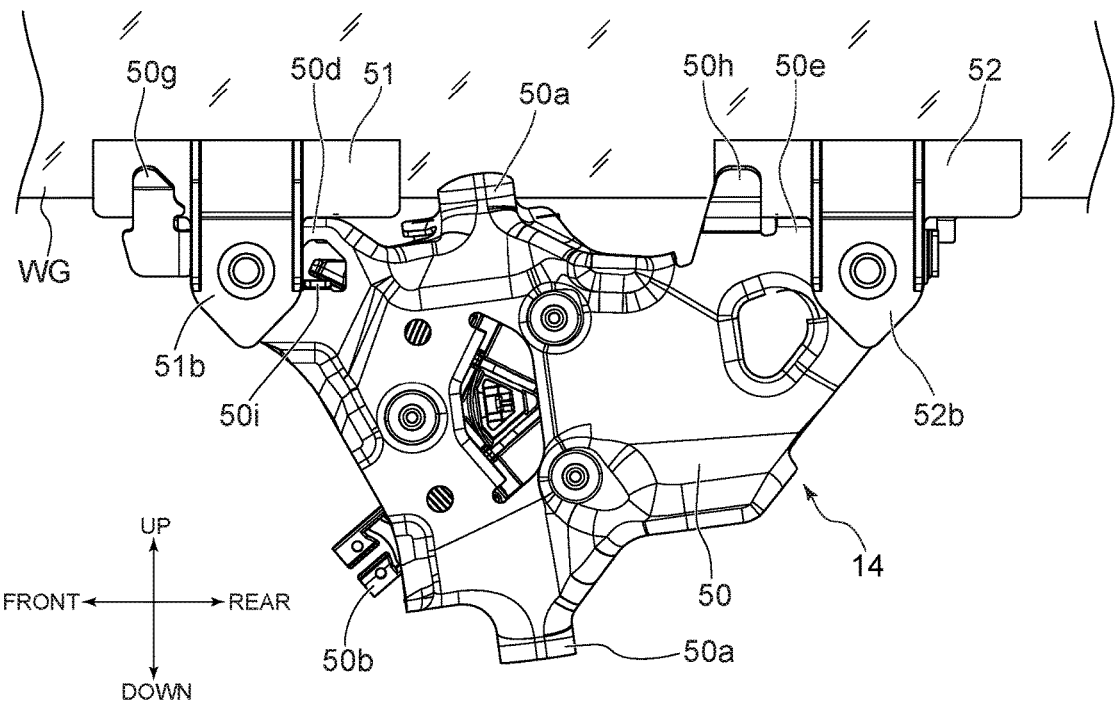
FIG. 7 is a front view illustrating a carrier plate.
Figure 8:
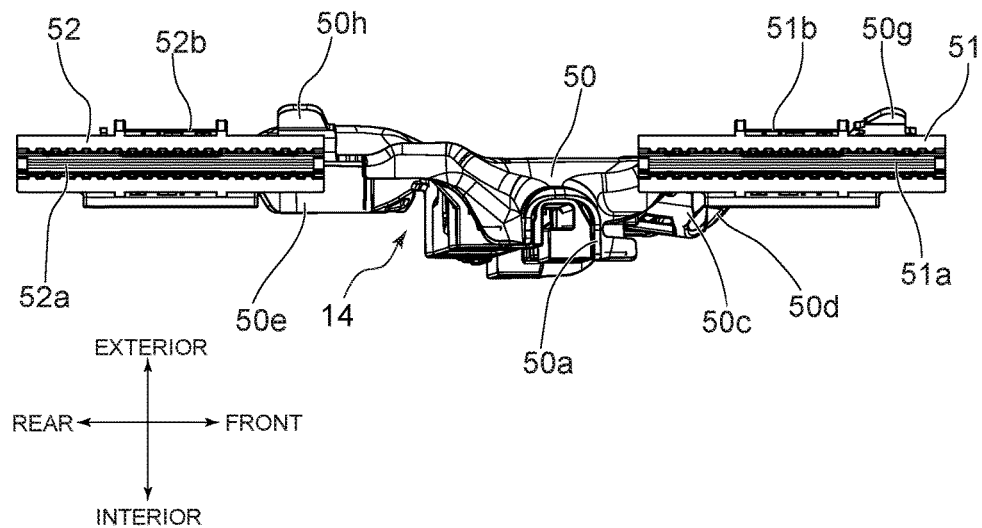
FIG. 8 is a top view illustrating the carrier plate.
Figure 10:
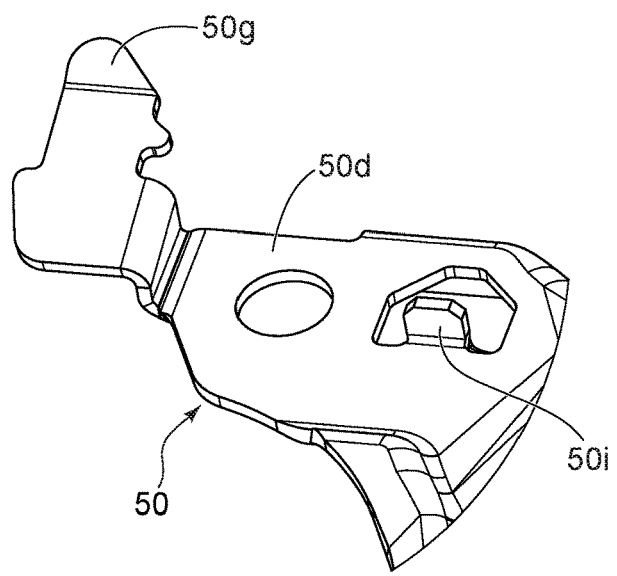
FIG. 10 is a perspective view illustrating a part of the carrier plate.

As illustrated in FIG. 10, a hook 50i is provided in the holder installation portion 50d of the slider 50. The hook 50i is a plate-shaped portion having a cantilever structure formed by cutting and erecting a part of the slider 50 such that a thickness direction of the plate of the hook 50i is oriented in the vertical direction, and a lateral width direction of the plate of the hook 50i is oriented in the front/rear direction. As illustrated in FIG. 7, while the glass holder 51 is installed in the slider 50, a side face of the contact portion 51b of the glass holder 51 approaches and faces the side face of the hook 50i.

If a moment for rotating the glass holder 51 (force of tilting the window glass WG in the vehicle front/rear direction) is exerted when the window glass WG is assembled with the glass holders 51 and 52, the side face of the contact portion 51b abuts on the side face of the hook 50i so as to restrict rotation of the glass holder Si. Since the contact portion 51b is shaped such that a horizontal width direction is oriented in a current load input direction, a basal end portion of the contact portion 51b is not easily bent by the load, so that it is possible to obtain an excellent load resistance.

Figure 15:
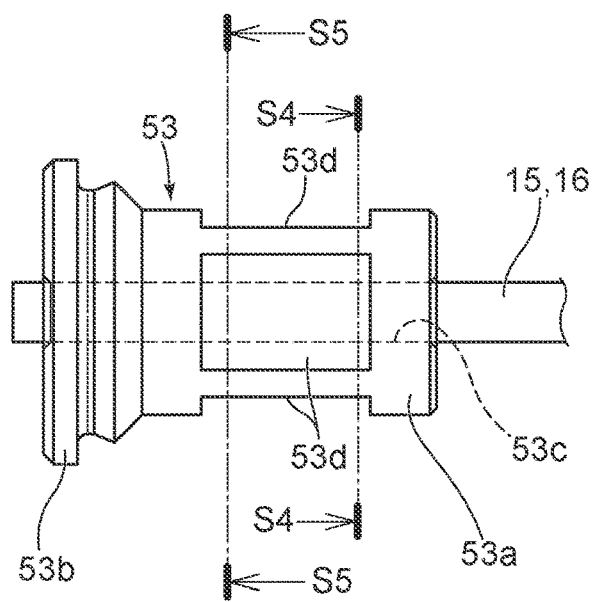
FIG. 15 is a side view illustrating an end structure of a driving wire.
Figure 16A:
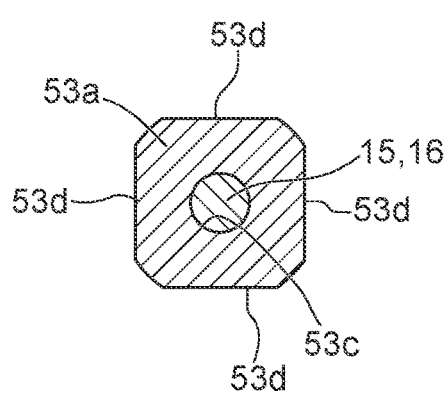
Figure 16B:
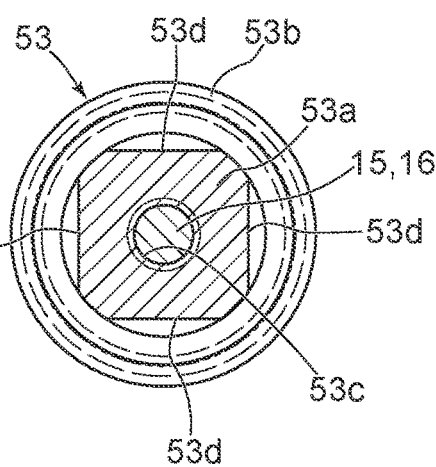
Figure 17:
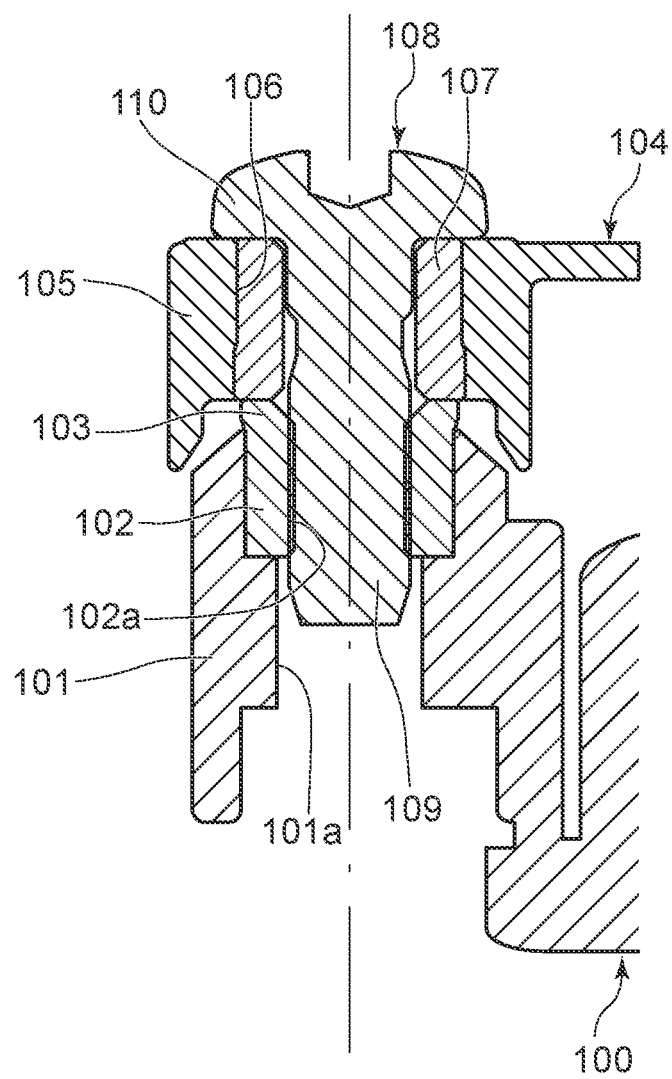
FIG. 17 is a cross-sectional view illustrating an exemplary vehicle component fastening structure of the prior art.

End structures of each driving wire 15 and 16 connected to the wire connecting portions 50*b* and 50*c* of the carrier plate 14 are illustrated in FIGS. 15 and 16. An end member 53 is installed in the end of each driving wire 15 and 16. The end member 53 has a shaft 53*a* and a flange 53*b* provided in one end of the shaft 53*a* with a diameter larger than that of the shaft 53*a*. At the center of the end member 53, a through-hole 53*c* penetrating in the axial direction from the shaft 53*a* to the flange 53*b* is provided.

The entire shaft 53*a* has a cylindrical outer surface shape, when the end member 53 is not installed in the driving wires 15 and 16. In order to install the end member 53 in the driving wires 15 and 16, the ends of the driving wires 15 and 16 are inserted into the through-hole 53*c*. In addition, by interposing and pressing the shaft 53*a* with a jig (not shown) in a diameter reducing direction, the inner surface of the through-hole 53*c* clamps the driving wires 15 and 16, so that the end member 53 is fixed by caulking. An outer surface of the portion of the shaft 53*a* subjected to the pressing force in the diameter reducing direction is crushed into a flat surface 53*d*.

The wire connecting portions 50*b* and 50*c* of the carrier plate 14 have an internal space where the end member 53 is inserted. In addition, the end members 53 installed in each driving wire 15 and 16 are inserted into the wire connecting portions 50*b* and 50*c* in a retained state, so that each driving wire 15 and 16 is connected to the carrier plate 14.

As illustrated in FIG. 1, a pulley bracket 17 is fixed in the vicinity of the upper end of the longitudinal direction of the guide rail 11, and the guide pulley 18 is rotatably supported on the pulley bracket 17 with a pulley support shaft 19. The driving wire 15 extends from the carrier plate 14 along the guide rail 11 in an upper direction of the guide rail 11 and is supported by a wire guide groove provided on an outer circumferential surface of the guide pulley 18. The guide pulley 18 rotates with respect to a pulley support shaft 19 depending on an advancing or retreating movement of the driving wire 15.

A wire guide member 20 is provided in the vicinity of the lower end of the longitudinal direction of the guide rail 11. The driving wire 16 extends in a lower direction of the guide rail 11 from the carrier plate 14 along the guide rail 11 and is guided by the wire guide member 20. The wire guide member 20 is fixed to the guide rail 11, and the driving wire 16 is supported so as to advance or retreat along a wire guide groove 20*a* (FIG. 11) provided in the wire guide member 20.

Figure 11:
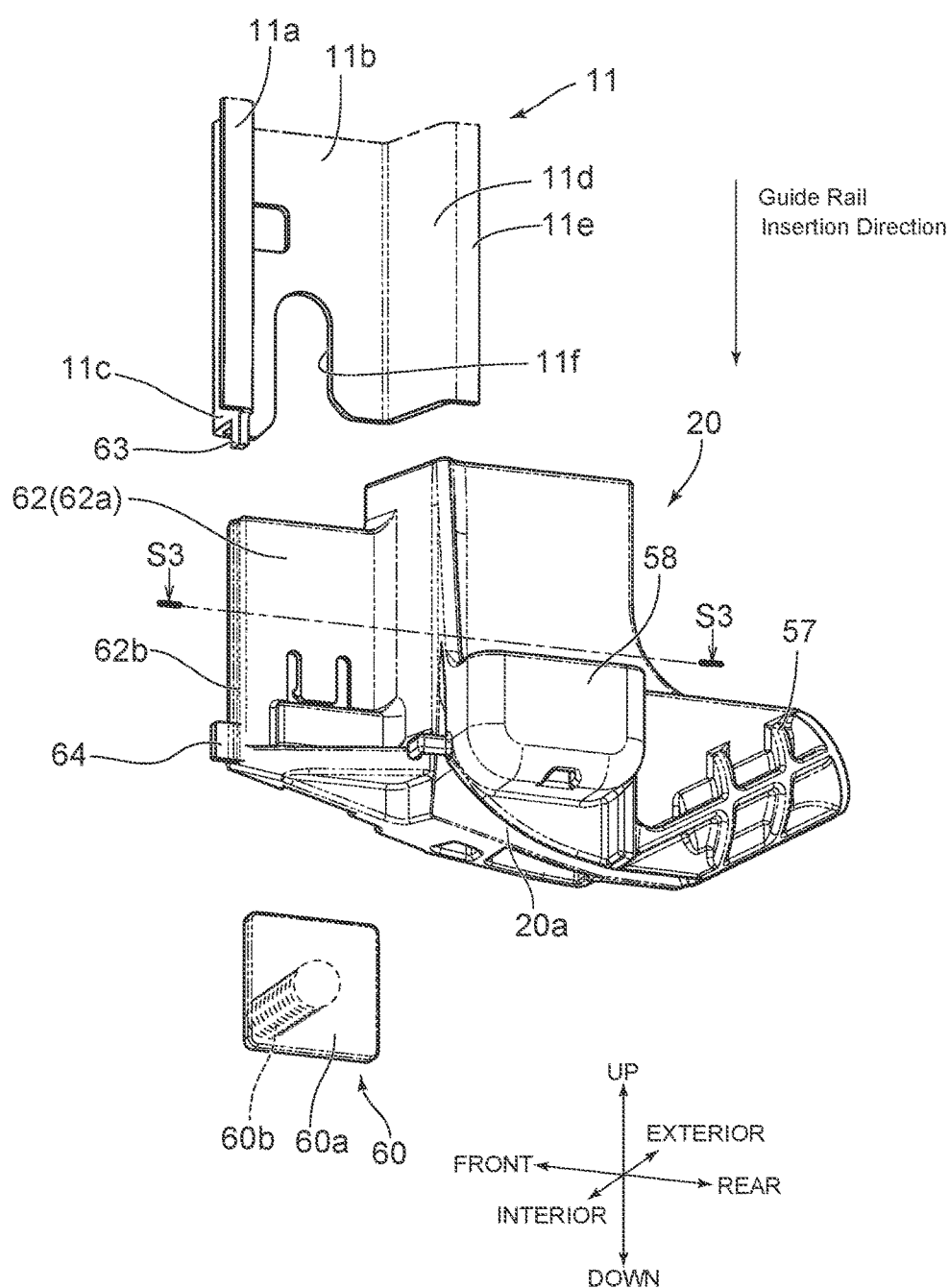
FIG. 11 is a perspective view illustrating a state in which a lower end of a guide rail and a wire guide member are disassembled.
Figure 12:
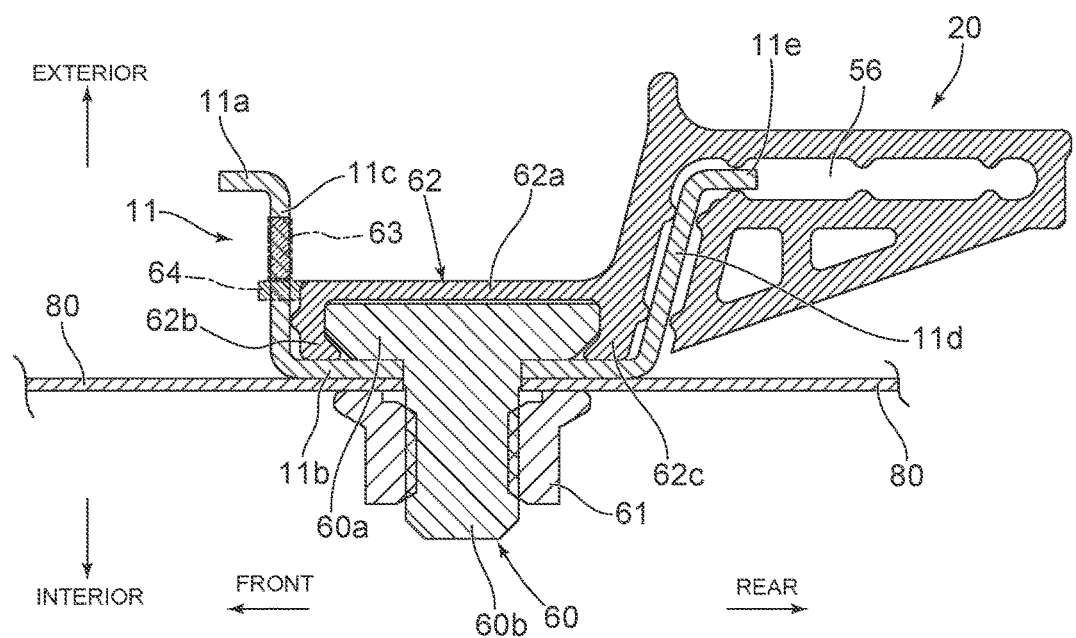
FIG. 12 is a cross-sectional view taken along the line S3-S3 of FIG. 11 to illustrate a state in which the wire guide member is installed in the guide rail.

As illustrated in FIGS. 11 and 12, the guide rail 11 has an exterior rail portion 11*a* and an interior rail portion 11*b* provided separately in the exterior side and the interior side. The exterior rail portion 11*a* and the interior rail portion 11*b* are connected to each other with a connecting rail portion 11*c* extending in the width direction, and a slanted rail portion 11*d* extends from an end of the interior rail portion 11*b* opposite to the connecting rail portion 11*c* toward the exterior side. An exterior rail portion 11*e* is provided in the end of the slanted rail portion 11*d* in parallel with the exterior rail portion 11*a*. At the lower end of the interior rail portion 11*b*, a slit 11*f* having an opened lower end and extending upward is provided. The upper end of the slit 11*f* is formed in a semicircular shape. The guide portion 50*a* of the carrier plate 14 is supported slidably against the exterior rail portion 11*a* and the connecting rail portion 11*c*.

The wire guide member 20 is a molded product formed of a synthetic resin material, and has a rail insertion groove 56 (FIG. 12), a tube insertion cylinder 57 (FIG. 11), and a stopper 58 (FIG. 11). The slanted rail portion 11*d* and the exterior rail portion 11*e* of the guide rail 11 are inserted into the rail insertion groove 56. A plurality of projecting ribs are provided inside the rail insertion groove 56, so that the slanted rail portion 11*d* and the exterior rail portion 11*e* are inserted into the rail insertion groove 56 while they are pressed and held by such ribs. A leading end of the outer tube 16A for inserting the driving wire 16 to the inside is inserted into the tube insertion cylinder 57. The stopper 58 is a part where the carrier plate 14 abuts for restricting further movement when the carrier plate 14 moves to the lowest side along the guide rail 11.

The lower end of the guide rail 11 and the wire guide member 20 are installed in the inner panel 80 using metal bolts 60 and nuts 61. As illustrated in FIGS. 11 and 12, the metal bolt 60 has a head 60*a* and the shank 60*b*. The head 60*a* is rectangular as seen in a plan view. A male thread is formed on an outer circumferential surface of the shank 60*b*.

The wire guide member 20 has a support portion 62 where the head 60*a* of the metal bolt 60 is insertable. The support portion 62 is a bottomed groove having a side facing the interior rail portion 11*b* of the guide rail 11 and an opened lower end side. More specifically, as illustrated in FIG. 12, the support portion 62 has a facing wall 62*a* facing (in parallel with) the interior rail portion 11*b* of the guide rail 11 (while the slanted rail portion 11*d* and the exterior rail portion 11*e* are inserted into the rail insertion groove 56) and a pair of side walls 62*b* and 62*c* extending to the interior side from both ends of the front/rear direction of the facing wall 62*a*.

While the slanted rail portion 11*d* and the exterior rail portion 11*e* of the guide rail 11 are inserted into the rail insertion groove 56, the head 60*a* of the metal bolt 60 is inserted from the lower side to the inside of the support portion 62. The head 60*a* enters into a gap between the facing wall 62*a* of the support portion 62 and the interior rail portion 11*b* of the guide rail 11 (refer to FIG. 12). The metal bolt 60 is inserted until the shank 60*b* reaches the innermost semicircular part of the slit 11*f*.

The shank 60*b* of the metal bolt 60 protrudes to the interior side through the slit 11*f* and the opening of the inner panel 80, and the nut 61 is screwed to the protruding part of the shank 60*b* (refer to FIG. 12). Rotation of the metal bolt 60 with respect to the wire guide member 20 is restricted as the rectangular head 60*a* abuts on the inner surface of the support portion 62 (such as the side wall 62*b* or 62*c*). Therefore, by fastening the nut 61 to a predetermined torque, the guide rail 11 and the wire guide member 20 are fixed to the inner panel 80 at the same time. In this fixed state, the head 60*a* of the metal bolt 60, the interior rail portion 11*b* of the guide rail 11, and the inner panel 80 come into contact sequentially (their metal parts make metallic contact with each other), so that a pressing force is not applied to the wire guide member 20.

As illustrated in FIG. 11, the guide rail 11 has a fitting portion 63 protruding downward in the lower end of the connecting rail portion 11*c*. The wire guide member 20 has a fitting portion 64 protruding to the vehicle front side (to be apart from the side wall 62*c*) in the lower end of the side wall 62*b* of the support portion 62. The fitting portion 64 is placed under the connecting rail portion 11*c* to face the lower end face of the connecting rail portion 11*c*. The fitting portion 63 is placed adjacent to the exterior side of the fitting portion 64.

As the fitting portion 64 abuts on the lower end surface of the connecting rail portion 11*c*, relative rotation between the guide rail 11 and the wire guide member 20 around an axis oriented to the width direction (inward/outward direction) is restricted. In addition, as the fitting portions 63 and 64 abut on each other, relative rotation between the guide rail 11 and the wire guide member 20 with respect to an axis directed to the front/rear direction is restricted. Therefore, in the process of simultaneously fixing the guide rail 11 and the wire guide member 20 to the inner panel 80 using the metal bolts 60 and nuts 61 by combining them, it is possible to stabilize a relative position between the guide rail 11 and the wire guide member 20 in the width direction (inward/outward direction) and the front/rear direction.

Figure 13:
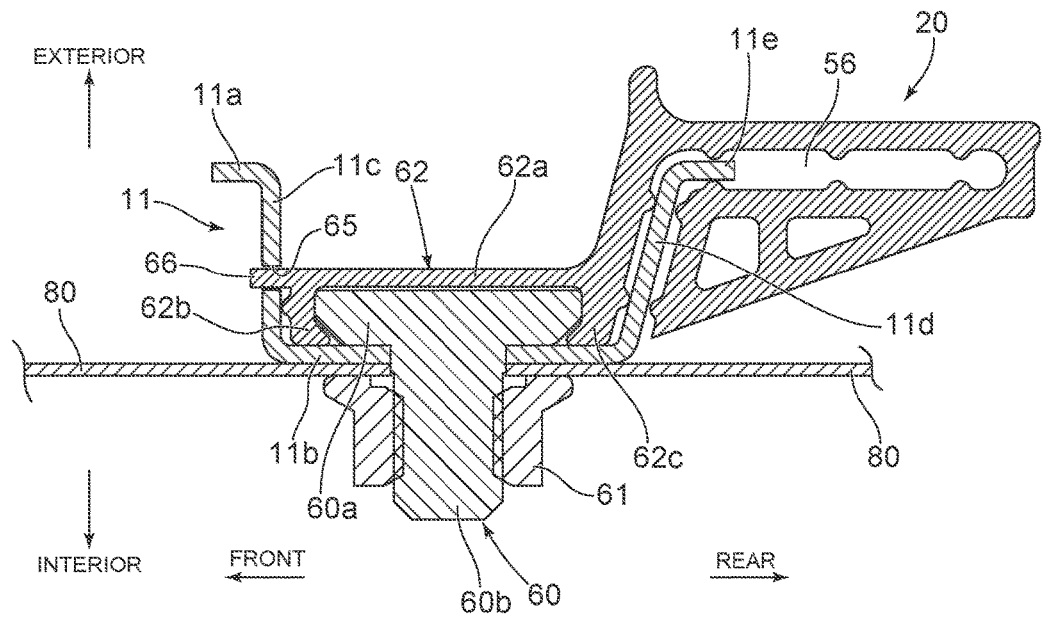
FIG. 13 is a cross-sectional view illustrating a first modification of a coupling portion between the guide rail and the guide member.

FIG. 13 illustrates a first modification of a coupling portion between the guide rail 11 and the wire guide member 20. A fitting hole 65 penetrating in the front/rear direction is formed in the connecting rail portion 11c of the guide rail 11. A fitting portion 66 protruding from the side wall 62b of the support portion 62 and inserted (penetrating) to the fitting hole 65 is provided in the wire guide member 20. As the fitting hole 65 and the fitting portion 66 are fitted, relative rotation between the guide rail 11 and the wire guide member 20 around the axis oriented to the width direction (inward/outward direction) and the axis oriented to the front/rear direction is restricted.

Figure 14:
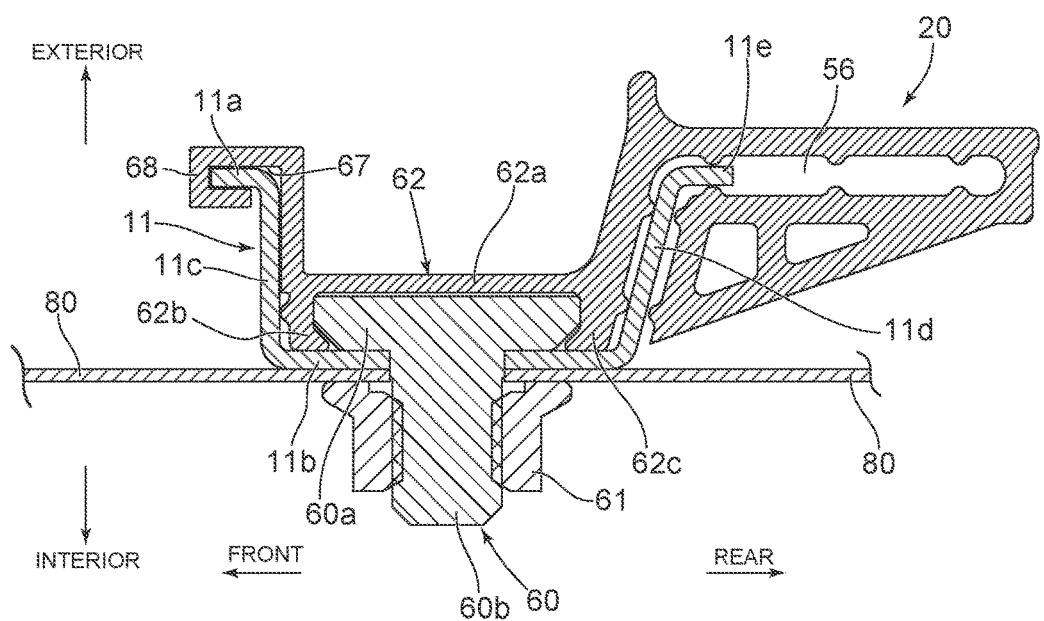
FIG. 14 is a cross-sectional view illustrating a second modification of the coupling portion between the guide rail and the guide member.

FIG. 14 illustrates a second modification of the coupling portion between the guide rail 11 and the wire guide member 20. The wire guide member 20 has an extending portion 68 extending from the support portion 62 and internally having a fitting groove 67. A part of the connecting rail portion 11c of the guide rail 11 and the exterior rail portion 11a are inserted into the fitting groove 67. Although not shown in the drawings, the fitting groove 67 is closed at one end of the vertical direction of the extending portion 68 (the longitudinal direction of the guide rail 11). Therefore, it is possible to restrict relative rotation between the guide rail 11 and the wire guide member 20 around the axis oriented to the width direction (inward/outward direction) and the axis oriented to the front/rear direction.

The relative rotation between the guide rail 11 and the wire guide member 20 around the two axes described above can be restricted using the fitting hole 65 and the fitting portion 66 of the configuration of FIG. 13 and using the fitting groove 67 (extending portion 68), the exterior rail portion 11a, and the connecting rail portion 11c of the configuration of FIG. 14, respectively.

A drum housing 21 is provided in a lateral side of the guide rail 11. A driving drum 22 (FIG. 6) is housed in the drum housing 21. The driving wire 15 extracted from the guide pulley 18 is inserted into the outer tube 15A having a tubular shape and is wound around the driving drum 22 inside the drum housing 21 where the outer tube 15A is connected. The driving wire 16 extracted from the wire guide member 20 is inserted into the outer tube 16A having a tubular shape and is wound around the driving drum 22 inside the drum housing 21 where the outer tube 16A is connected.

The driving drum 22 has a cylindrical shape, and a shaft fitting hole 22a penetrating in the axial direction is provided at the center of the driving drum 22. Saw-toothed serration is provided on the inner surface of the shaft fitting hole 22a. A spiral groove 22b where the driving wires 15 and 16 are wound is provided on the outer circumferential surface of the driving drum 22. The spiral groove 22b changes a position of the axial direction of the driving drum 22 while turning along the outer circumferential surface of the driving drum 22.

The motor unit 23 is installed in the drum housing 21. The motor unit 23 has a motor 24, a gearbox 25 internally having a reduction gear train for transmitting rotation of the output shaft of the motor 24 while decelerating the rotation, and a fitted shaft 26 (FIG. 6) where a rotational driving force of the motor 24 is transmitted via the reduction gear train of the gearbox 25. Note that, although the motor unit 23 is illustrated as a uniform cross-sectional structure including the fitted shaft 26 in FIG. 6, the fitted shaft 26 is a part that can rotate independently in a state where the motor unit 23 is installed in the drum housing 21.

The motor unit 23 has a cover portion 23a (FIG. 6) that covers an opening part of the drum housing 21 (the storage opening 27c of the drum storing portion 27 described below), and the fitted shaft 26 protrudes from the cover portion 23a and is fitted to the shaft fitting hole 22a of the driving drum 22. The fitted shaft 26 has serration fitted to the serration of the shaft fitting hole 22a, so that the driving drum 22 rotates along with the fitted shaft 26 as the motor 24 is driven in this fitted state.

The outer tube 15A has one end connected to the pulley bracket 17 and the other end connected to the drum housing 21, so that positions of both ends are determined. The driving wire 15 can advance or retreat inside the outer tube 15A. One end of the outer tube 16A is connected to the wire guide member 20, and the other end is connected to the drum housing 21, so that positions of both ends are determined. The driving wire 16 can advance or retreat inside the outer tube 16A.

The drum housing 21 is fixed to the inner panel 80 (FIG. 12) of the vehicle. As the driving drum 22 rotates forward or reverse by a driving force of the motor 24, one of the driving wires 15 or 16 increases a winding amount of the driving drum 22 to the spiral groove 22b, and the other driving wire 15 or 16 is extracted from the spiral groove 22b of the driving drum 22, so that the carrier plate 14 moves along the guide rail 11 depending on an extraction and releasing relationship of the driving wires 15 and 16. As the carrier plate 14 moves, the window glass WG is lifted or lowered.

Figure 2:
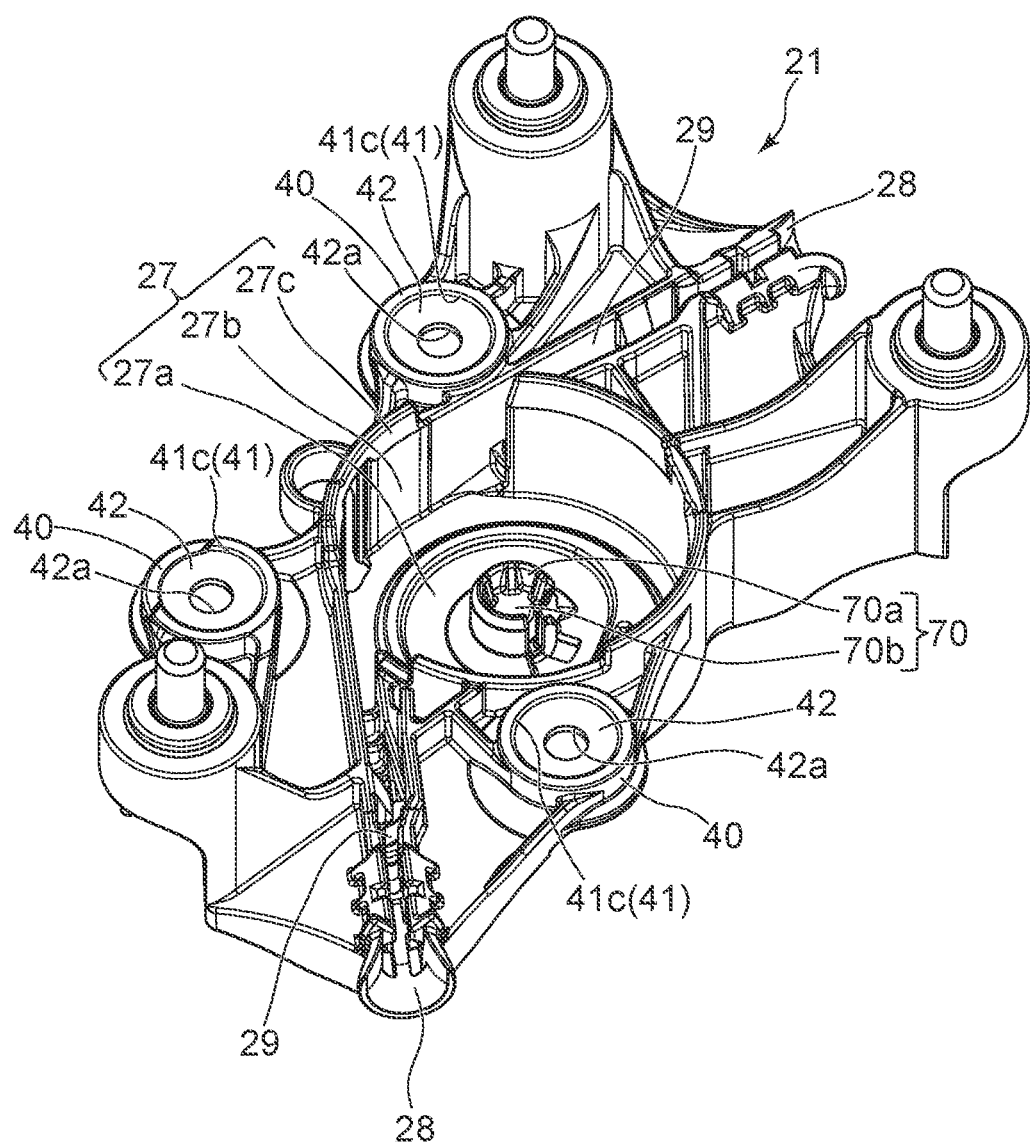
FIG. 2 is a perspective view illustrating a configuration of a drum housing.

As illustrated in FIG. 2, the drum housing 21 has a drum storing portion 27 and a pair of outer tube inserting portions 28. The drum storing portion 27 forms a space surrounded by a bottom 27a and a cylindrical standing wall 27b provided along circumferential edge of the bottom 27a, and the side opposite to the bottom 27a is opened as the storage opening 27c. The drum housing 21 has a pair of wire-passing grooves 29 that communicate with the drum storing portion 27 and are formed in different directions (directions of the pulley bracket 17 and the wire guide member 20 in a completed state of the window regulator 10), and a pair of outer tube inserting portions 28 are provided at the leading ends of the pair of wire-passing grooves 29.

Figure 6:
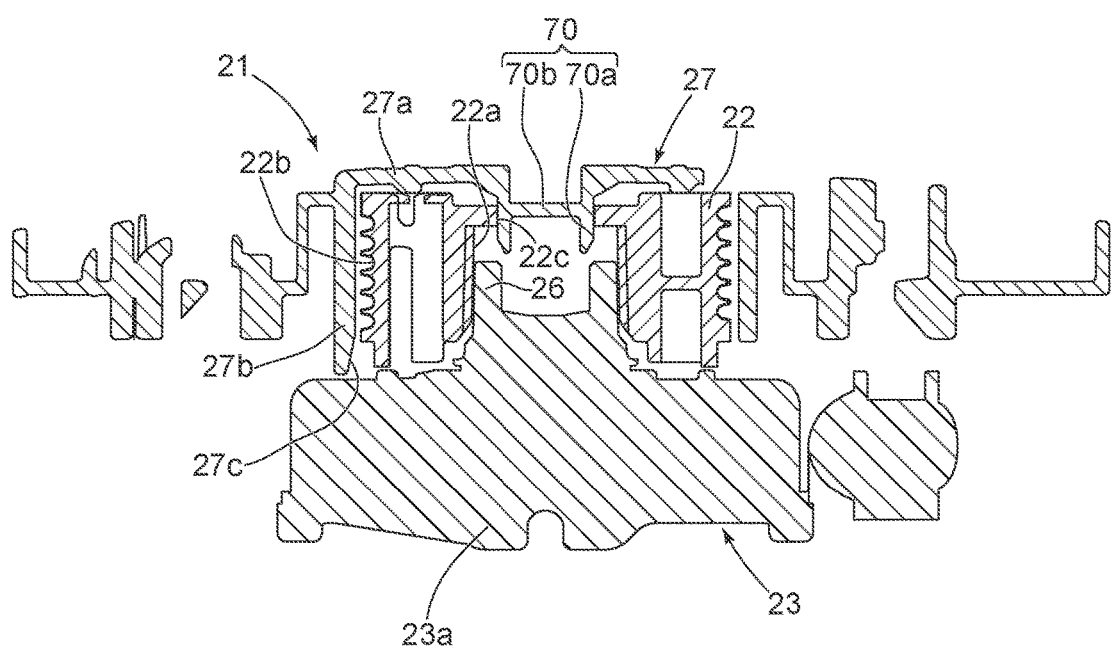
FIG. 6 is a cross-sectional view taken along the line S2-S2 of FIG. 1 to illustrate a drum storing portion and a motor unit.

As illustrated in FIGS. 2 and 6, a drum support protrusion 70 is protrudingly provided at the center of the bottom 27a of the drum storing portion 27. A support hole 22c communicating with the end of the shaft fitting hole 22a is penetratingly formed in the driving drum 22. The support hole 22c is a circular hole having a diameter smaller than that of the shaft fitting hole 22a, and the drum support protrusion 70 is inserted into the support hole 22c. The drum support protrusion 70 has a cylindrical portion 70a where the support hole 22c is fitted relatively rotatably, and a bridge portion 70b that connects the inner surface of the cylindrical portion 70a.

Using the drum support protrusion 70, it is possible to prevent tilting of the driving drum 22 to the drum storing portion 27. In particular, during a work for winding the driving wires 15 and 16 around the driving drum 22, a force of tilting the driving drum 22 easily acts due to the wire tension on one side. In this case, it is possible to improve workability by suppressing tilting of the driving drum 22 using the drum support protrusion 70.

Subsequently, a fastening structure between the drum housing 21 and the motor unit 23 will be described mainly with reference to FIG. 3. The drum housing 21 is a synthetic resin molding product, and a washer 42 as a metal part is incorporated through insert-molding as described below. The motor unit 23 has a main body 30 formed of synthetic resin, and the gear housing part for housing the reduction gear train in the gear box 25 or the cover portion 23a that covers the storage opening 27c of the drum housing 21 are formed as a part of the main body 30. In the following description regarding the fastening structure between the drum housing 21 and the motor unit 23, the vertical direction of FIG. 3 will be referred to as a fastening axis direction X, a direction advancing toward the drum housing 21 side of the fastening axis direction X will be referred to as a first direction X1, and a direction advancing toward the motor unit 23 side will be referred to as a second direction X2. Furthermore, a direction perpendicular to the fastening axis direction X will be referred to as a radial direction.

Figure 3:
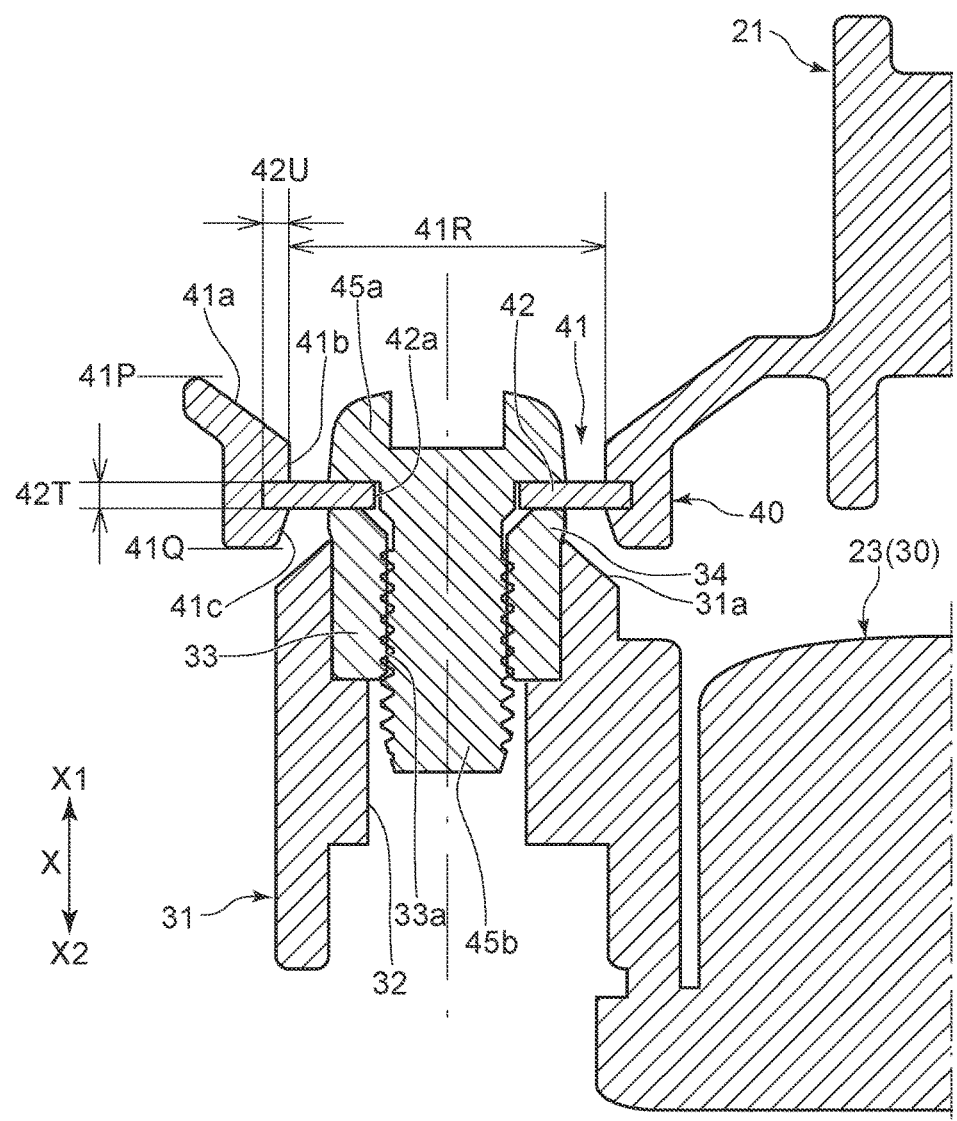
FIG. 3 is a cross-sectional view taken along the line S1-S1 of FIG. 1 to illustrate a fastening structure for a drum housing and a motor unit.

The main body 30 of the motor unit 23 has three bosses (only one is illustrated in FIG. 3) having leading ends protruding to the first direction X1 around the cover portion 23a. As illustrated in FIG. 3, the boss 31 has a tubular shape having a through-hole 32 formed to penetrate in the fastening axis direction X, and a column 33 formed of metal such as aluminum is held (inserted) to the inside of the boss 31 (on the end side of the first direction X1). The column 33 is a tubular body internally having a fastener hole 33a having a diameter smaller than that of the through-hole 32. The fastener hole 33a is provided in the end side of the first direction X1 of the boss 31.

A conical tapered surface 31a having an outer diameter reduced toward the first direction X1 is provided on an outer surface of the leading end side of each boss 31. A metallic leading-end abutting portion 34 is provided on the outermost leading end of the boss 31. The leading-end abutting portion 34 is formed as a part of the column 33 and protrudes from the through-hole 32 to the first direction X1.

The drum housing 21 has three boss receptacles 40 (FIGS. 1 and 3) for receiving the three bosses 31 of the motor unit 23. Each boss receptacle 40 has a through-hole 41 penetrating in the fastening axis direction X. The through-hole 41 has a constant diameter hole 41b having a constant diameter, a conical tapered surface 41a having an inner diameter increasing from one end of the constant diameter hole 41b toward the first direction X1, and a conical tapered surface 41c having an inner diameter increasing from the other end of the constant diameter hole 41b toward the second direction X2.

As illustrated in FIG. 3, although the tapered surface 41a partially differs in the protrusion amount to the first direction X1, a portion of the tapered surface 41a having the smallest protruding amount to the first direction X1 is set as a first end 41P of the through-hole 41. In addition, a location of the end of the tapered surface 41c in the second direction X2 is set as a second end 41Q of the through-hole 41. An interval between the first end 41P and the second end 41Q is the length of the through-hole 41 of the fastening axis direction X (the thickness of the boss receptacle 40).

As illustrated in FIG. 3, the inner diameter 41R of the constant diameter hole 41b is larger than the outer diameter of the leading-end abutting portion 34 of the boss 31 and is smaller than the outer diameter of the largest diameter part of the tapered surface 31a. Accordingly, the leading-end abutting portion 34 can enter the inside of the through-hole 41.

Figure 4:
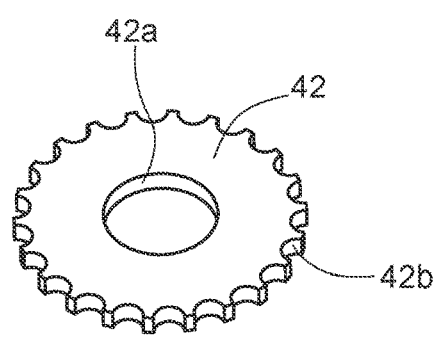
FIG. 4 is a perspective view illustrating a washer of a boss receptacle.

The boss receptacle 40 has a metallic washer 42 inside the through-hole 41 (refer to FIGS. 3 and 4). The washer 42 is a disk-like part having a bolt insertion hole 42a in its center and is buried in the through-hole 41 by insert-molding when the synthetic resin drum housing 21 is formed.

The washer 42 has a thickness 42T in the fastening axis direction X smaller (thinner) than the length of the constant diameter hole 41b in the fastening axis direction X, and the washer 42 is disposed near the tapered surface 41c in the constant diameter hole 41b. In this state, the front and back surfaces of the washer 42 are flat surfaces directed to the first and second directions X1 and X2, respectively.

The washer 42 has an outer diameter larger than the inner diameter 41R of the constant diameter hole 41b, and the circumferential edge of the radial direction of the washer 42 is buried in the inner surface of the constant diameter hole 41b (the synthetic resin thick part of the boss receptacle 40). The buried amount 42U of the circumferential edge of the washer 42 is equal to or larger than the thickness 42T of the washer 42 (42U≥42T). By setting the relationship between the thickness 42T of the washer 42 and the buried amount 42U of the washer 42 in this manner, it is possible to secure a support strength of the washer 42 inside the boss receptacle 40.

As illustrated in FIG. 4, a gear-like rotation stopper 42b is provided on the outer circumference of the washer 42. As an uneven shape of the rotation stopper 42b is engaged with the thick part of the boss receptacle 40, rotation of the washer 42 can be reliably restricted. Note that the washer 42 may also be omitted from the rotation stopper 42b.

The inner diameter of the bolt insertion hole 42a of the washer 42 is larger than the inner diameter of the fastener hole 33a of the boss 31. The diameter of the leading-end abutting portion 34 is larger than the inner diameter of the bolt insertion hole 42a, and a leading end face of the leading-end abutting portion 34 oriented in the first direction X1 may abut on the surface of the washer 42 around the bolt insertion hole 42a.

Three boss receptacles 40 having the aforementioned configuration are provided to surround the drum storing portion 27 as seen in a plan view (refer to FIGS. 1 and 2). Although not shown in FIG. 1, three bosses 31 are also provided to match the three boss receptacles 40 to surround the drum storing portion 27. The motor unit 23 and the drum housing 21 are fixed by fastening each of the three metal fastening bolts 45 between each of the three bosses 31 and each of the three boss receptacles 40.

Each fastening bolt 45 has a head 45a located in an end of the first direction X1 and a shank 45b protruding from the head 45a in the second direction X2. The head 45a has a diameter larger than that of the shank 45b. A male thread is formed on the outer circumferential surface of the shank 45b. The head 45a has a bottom face 45c oriented to the second direction X2. The bottom face 45c is a plane perpendicular to the fastening axis direction X.

The motor unit 23 and the drum housing 21 are combined as described below. First, each of the leading-end abutting portion 34 of the boss 31 and the tapered surface 41a of the boss receptacle 40 is oriented to the first direction X1, so that the three boss receptacles 40 of the drum housing 21 and the three bosses 31 of the motor unit 23 face each other. In this state, if the drum housing 21 and the motor unit 23 approach each other in the fastening axis direction X, the leading-end abutting portions 34 of each boss 31 abut on the washers 42 of each boss receptacle 40. In this case, even when a positional relationship between the boss 31 and the boss receptacle 40 is slightly deviated in the radial direction, the leading-end abutting portion 34 is guided to the center side of the radial direction of the through-hole 41 by the tapered surface 41c of the through-hole 41 and the tapered surface 31a of the boss 31. Therefore, it is possible to stably assemble the motor unit 23 and the drum housing 21 without requiring high positioning accuracy.

Subsequently, each boss 31 and each boss receptacle 40 are fastened to each other with three fastening bolts 45. Each fastening bolt 45 is inserted into the through-hole 41 of the boss receptacle 40 from the tapered surface 41a side by orienting the leading end of the shank 45b to the second direction X2. Since the through-hole 41 has the tapered surface 41a formed to have an inner diameter gradually increasing to the first direction X1, the inserted shank 45b can be reliably guided to the constant diameter hole 41b.

The male thread of the shank 45b is fastened to the fastener hole 33a by rotating the fastening bolt 45 in a screwing direction when the shank 45b inserted into the constant diameter hole 41b reaches the fastener hole 33a of the boss 31 through the bolt insertion hole 42a of the washer 42. This fastening may be performed by tapping on the inner surface of the fastener hole 33a having no female thread or by screwing to the female thread formed on the inner surface of the fastener hole 33a in advance. The fixing using the fastening bolt 45 is completed in the state of FIG. 3 by fastening the fastening bolt 45 to a predetermined fastening torque until the entire bottom face 45c of the head 45a abuts on the washer 42. As a result, the washer 42 is nipped between the head 45a of the fastening bolt 45 and the leading-end abutting portion 34 of the boss 31, and the motor unit 23 and the drum housing 21 are fixed to each other. In the fastening completion state of the fastening bolt 45, a part of the leading end of the shank 45b protrudes from the fastener hole 33a in the second direction X2 and enters the back side of the through-hole 32.

Each fastening bolt 45 is inserted into the through-hole 41 of the boss receptacle 40 and is fastened to the fastener hole 33a of the boss 31 while being gripped by a jig (not shown). Handling of the jig is performed in the opening side of the first direction X1 of the through-hole 41. Since this opening of the through-hole 41 has the tapered surface 41a formed to have a gradually increasing inner diameter, it is possible to obtain excellent workability by preventing interference with the jig. In particular, in a case where a jig capable of gripping the fastening bolt 45 from the outside of the radial direction is employed, it is possible to obtain high effectiveness of the tapered surface 41a.

While the motor unit 23 and the drum housing 21 are fixed by fastening the fastening bolts 45 as illustrated in FIG. 3, both the portion of the leading-end abutting portion 34 of the boss 31 abutting on the washer 42 and the entire bottom face 45c of the head 45a of the fastening bolt 45 (the portion abutting on the washer 42) are placed within a range of the through-hole 41 of the boss receptacle 40 in the fastening axis direction X (between the first end 41P and the second end 41Q). In this manner, since the thin washer 42 disposed inside the through-hole 41 is used as a nipping portion between the leading-end abutting portion 34 of the boss 31 and the head 45a of the fastening bolt 45, it is possible to thin the fastening portion in the fastening axis direction X.

In the fastening state of FIG. 3, the head 45a of the fastening bolt 45 enters the inside of the through-hole 41 of the boss receptacle 40, and does not protrude from the through-hole 41 to the first direction X1. More specifically, the height of the head 45a from the bottom face 45c to the first direction X1 is smaller than the depth of the through-hole 41 from the first end 41P to the washer 42. As a result, it is possible to thin the fastening portion including the head 45a of the fastening bolt 45. In addition, since the head 45a does not protrude outside the boss receptacle 40, it is possible to thin the entire fastening portion without necessity of providing the boss receptacle 40 with a padding portion or the like for surrounding the head 45a and to reduce the cost or labor for the manufacturing.

Since the thin washer 42 can be obtained with a smaller material amount, compared to a cylindrical collar having a length that occupies the entire through-hole 41 in the fastening axis direction X, it is also possible to suppress a manufacturing cost and achieve a light weight. In addition, the washer 42 is also advantageous in that high processing accuracy can be easily secured at low cost, compared to the long collar. Furthermore, in a case where the gear-like rotation stopper 42b is provided in the washer 42, the rotation stopper 42b can be formed in the press-molding process of the washer 42 and can be manufactured easily at low cost.

Since the thin washer 42 is used, it is possible to shorten the length of the shank 45b of the fastening bolt 45 inserted into the bolt insertion hole 42a of the washer 42. Since the shank 45b is short, it is possible to suppress a material cost of the fastening bolt 45 and reduce the cost. Furthermore, if the shank 45b is short, it is also advantageous in weight reduction, accuracy control, securing of rigidity, or the like.

Figure 5:
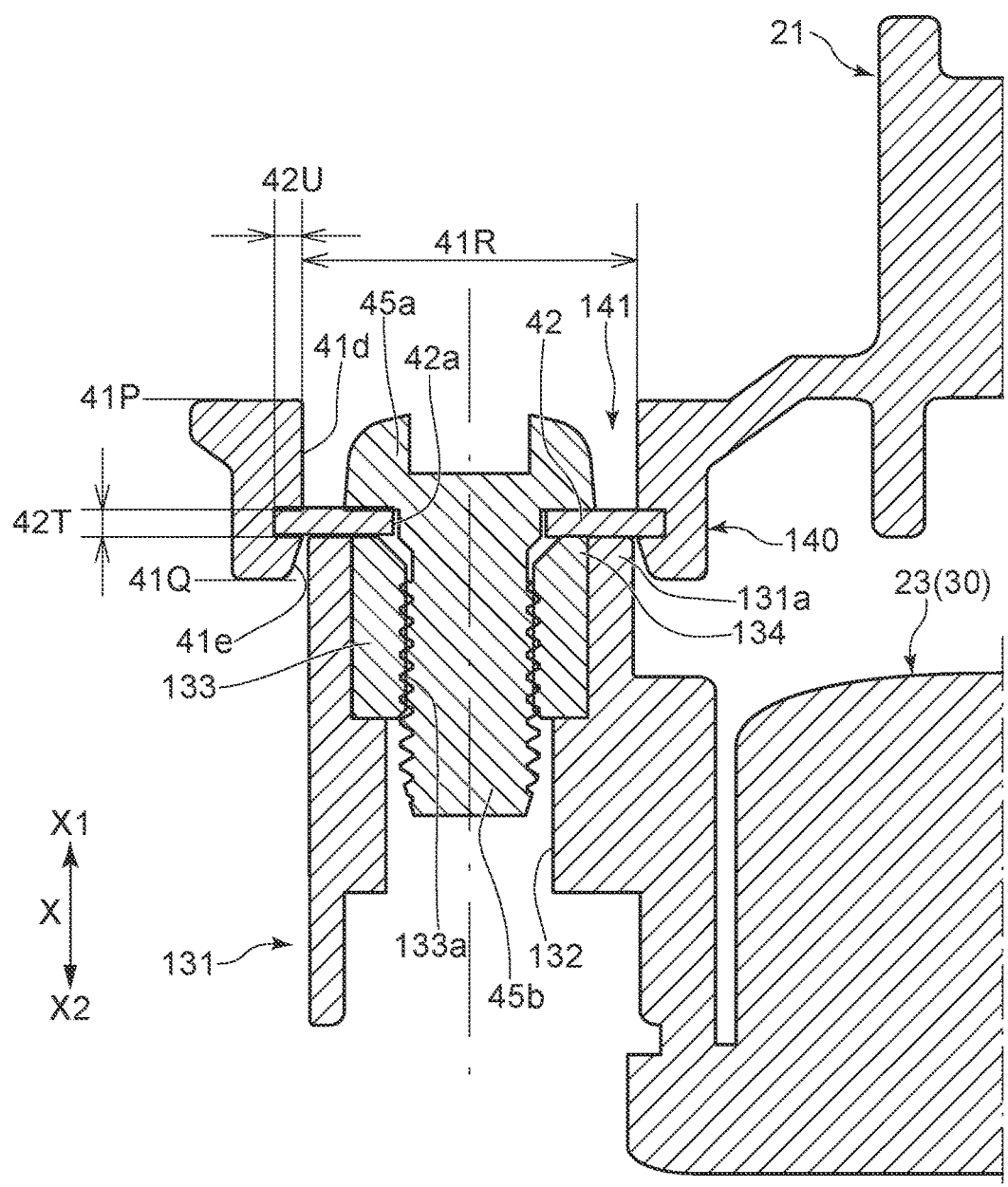
FIG. 5 is a cross-sectional view illustrating a modification of the fastening structure for the drum housing and the motor unit.

FIG. 5 illustrates a modification of the fastening structure between the drum housing 21 and the motor unit 23. In this modification, a through-hole 141 of a boss receptacle 140 provided in the drum housing 21 has a constant diameter hole 41d and a tapered surface 41e. The constant diameter hole 41d has an inner diameter 41R having a constant size, and continuously extends to the end of the through-hole 141 in the first direction X1. This end of the constant diameter hole 41d of the first direction X1 corresponds to the first end 41P of the through-hole 141. In other words, the through-hole 141 does not have the portion corresponding to the tapered surface 41a of the aforementioned embodiment. The tapered surface 41e has the same configuration as that of the tapered surface 41c of the aforementioned embodiment.

A column 133 formed of metal such as aluminum is held (inserted) inside the boss 131 provided in the motor unit 23. The column 133 internally has a fastener hole 133a having a diameter smaller than that of the through-hole 132 of the boss 131. The leading end of the column 133 serves as a leading-end abutting portion 134 so that a leading end face of the leading-end abutting portion 134 oriented to the first direction X1 abuts on the washer 42. The boss 131 has an annular leading end portion 131a that surrounds the leading-end abutting portion 134. The outer diameter of the annular leading end portion 131a is slightly smaller than the inner diameter 41R of the constant diameter hole 41d. The boss 131 does not have a tapered shape corresponding to the tapered surface 31a of the aforementioned embodiment in the outer surface, but has a cylindrical outer surface shape continuously extending to the annular leading end portion 131a.

If the shank 45b of the fastening bolt 45 is inserted and fastened into the fastening hole 133a, the male thread of the shank 45b is fastened to the inner surface of the fastening hole 133a by tapping or screwing. In addition, the drum housing 21 and the motor unit 23 are fastened and fixed by nipping the washer 42 between the bottom face 45c of the head 45a and the leading-end abutting portion 134 (and the annular leading end portion 131a) of the boss 131. In this fastening state, the entire head 45a of the fastening bolt 45 is placed within a range of the constant diameter hole 41d of the through-hole 141 (between the first end 41P and the washer 42) in the fastening axis direction X (refer to FIG. 5). Therefore, similar to the aforementioned embodiment, this contributes to thinning of the fastening portion for fastening the drum housing 21 and the motor unit 23.

As described above, according to the present invention, it is possible to implement fastening of vehicle components with high accuracy using the small-sized fastening structure that can be manufactured at low cost.

Although the fastening bolt 45 fastened by tapping or screwing to the fastener hole 33a or 133a is employed as the fastening member in the embodiment described above, a fastening member other than the bolt (screw member) may also be employed. For example, a rivet that does not have a male thread on the shaft portion may be employed as the fastening member. Specifically, the female thread is not provided inside the fastener hole 33a or 133a of the embodiment described above, and a shank of the rivet is inserted and fastened to the fastener hole 33a or 133a, instead of the shank 45b of the fastening bolt 45 of the embodiment described above.

In the embodiment described above, the shank 45b of the fastening bolt 45 is fastened to the column 33 or 133 held inside the boss 31 or 131 in the fixed state. Alternatively, instead of the columns 33 and 133, a nut detachably installed to the through-hole 32 or 132 of the boss 31 or 131 may be provided, so that this nut may be screwed and fastened to a shaft of the shank 45b of the fastening bolt 45.

Although the aforementioned embodiment is an example applicable to the motor unit 23 and the drum housing 21 of the window regulator 10, the present invention may also be applicable to other components of the window regulator 10 or fastening of vehicle components other than the window regulator 10.

Examples of the present invention are not limited to the embodiments and modifications described above, but various changes, substitutions, or alterations maybe possible without departing from the spirit and scope of the invention. In addition, if the technical concept of the present invention can be implemented using another method based on a technical progress or another derived technology, the present invention may be embodied using such a method. Therefore, the claims encompass all possible embodiments that can be included within the scope of the technical idea of the present invention.

What is claimed is:

1. A vehicle component fastening structure for fixing two vehicle components, comprising:
    a boss receptacle provided in one of the vehicle components, the boss receptacle having a through-hole penetrating in a fastening axis direction and a nipped portion provided inside the through-hole by insert-molding to be thinner than the through-hole in the fastening axis direction;
    a boss provided in the other vehicle component, the boss internally having a fastener hole, a leading end of the boss oriented to a first direction of the fastening axis direction abutting on the nipped portion; and
    a fastening member having a shank inserted into the through-hole in a second direction opposite to the first direction and inserted into the fastener hole through the nipped portion and a head abutting on the nipped portion,
    wherein the head of the fastening member has a bottom face abutting on the nipped portion, and
    the entire bottom face of the head of the fastening member and a portion of the nipped portion where the leading end of the boss abuts are placed within a range of the through-hole in the fastening axis direction.

2. The vehicle component fastening structure according to claim 1, wherein the nipped portion has a disk shape and is provided in the boss receptacle by burying a circumferential edge of a radial direction into an inner surface of the through-hole, and
    a buried amount of the circumference edge of the nipped portion in the radial direction is equal to or larger than a thickness of the nipped portion in the fastening axis direction.

3. The vehicle component fastening structure according to claim 1, wherein the entire head is placed within a range of the through-hole in the fastening axis direction while the head of the fastening member abuts on the nipped portion.

4. The vehicle component fastening structure according to claim 1, wherein the through-hole has a tapered surface having an inner diameter increasing toward the first direction in an end of the first direction side.

* * * * *